United States Patent [19]

Seeley et al.

[11] Patent Number: 4,701,712

[45] Date of Patent: Oct. 20, 1987

[54] THERMOREGULATED MAGNETIC SUSCEPTIBILITY SENSOR ASSEMBLY

[75] Inventors: Robert L. Seeley, Denver; Joseph J. Barth, Lakewood; Gerald H. Clayton, II, Northglenn, all of Colo.

[73] Assignee: The United States of America as represented by the Secretary of the Interior, Washington, D.C.

[21] Appl. No.: 357,363

[22] Filed: Mar. 12, 1982

[51] Int. Cl.⁴ .......................... G01V 3/10; G01V 3/18; G01V 3/08; G01N 33/12

[52] U.S. Cl. .................................... 324/340; 324/224; 324/346

[58] Field of Search ............... 324/224, 339, 340, 341, 324/346

[56] References Cited

U.S. PATENT DOCUMENTS

| | | | |
|---|---|---|---|
| 3,094,658 | 6/1963 | Bravenec et al. | 324/339 |
| 3,818,323 | 6/1974 | Dowling et al. | 324/339 |
| 4,107,607 | 8/1978 | Kirkland | 324/224 |

FOREIGN PATENT DOCUMENTS

| | | | |
|---|---|---|---|
| 0021363 | 2/1979 | Japan | 324/224 |

*Primary Examiner*—Reinhard J. Eisenzopf
*Assistant Examiner*—W. Snow
*Attorney, Agent, or Firm*—Thomas Zack; E. Philip Koltos

[57] ABSTRACT

A thermoregulated magnetic susceptibility sensor assembly for well-logging or the like is disclosed. The assembly includes a sensing solenoid and a non-metallic container for the sensing solenoid. Located in the container and spaced from the sensing solenoid are a plurality of heaters. These heaters are uniformly positioned about the sensing solenoid and a heat transfer material is located between the heaters and the sensing solenoid. The heat transfer material conducts the heat from the heaters to the sensing solenoid in a substantially uniform manner so that the sensing solenoid is maintained at a uniform temperature. Preferably, temperature sensors are provided to control the heat output of the heaters to maintain the sensing solenoid at the desired uniform temperature. To minimize heat transfer to the heaters from the external environment, a layer of insulation is provided around the heaters. The heaters are also preferably arranged in an even number of columns and are connected in a series so that adjacent columns have current flowing therein in opposite directions.

11 Claims, 5 Drawing Figures

THERMOREGULATED MAGNETIC SUSCEPTIBILITY SENSOR ASSEMBLY

FIELD OF THE INVENTION

This invention relates generally to a magnetic susceptibility sensor for well-logging or the like and more particularly to a thermoregulated sensor assembly of this type.

BACKGROUND OF THE INVENTION

The relationship between magnetic susceptibility and ferromagnetic minerals in rock is well established. Although this relationship varies with mineral assemblage, rock type, and with grain size, shape and orientation, there is in almost all cases, a strong sometimes nearly linear correlation between the magnetic susceptibility and ferromagnetic mineral content. Well-logging measurements of magnetic rocks that contain ore grade concentrations of iron minerals are possible with relatively simple, low-sensitivity logging probes. However, measurements become increasingly difficult as the ferromagnetic mineral content decreases to the low levels generally associated with sedimentary rocks (less than 0.1% magnetite). In order to measure the magnetic susceptibility of these rocks, the sensitivity of the well-logging system must be increased by several orders of magnitude. Consequently, noise and drift due to temperature variation and the mechanical stress on the components in the measurement system become significant. Nevertheless, borehole measurements of magnetic susceptibility of rocks that have low concentrations of ferromagnetic minerals is desirable because these measurements may reveal alteration zones associated with the emplacement of valuable non-ferrous minerals, particularly uranium in roll-type deposits.

In general, magnetic susceptibility in a borehole is measured by detecting changes in the effective inductance of a solenoid. This inductance is a function of the number of turns and the diameter of the wire wound in a helix about a core, and the properties of the core and all of the material surrounding the entire solenoid. All of these factors are temperature dependent.

Prior U.S. Pats. which describe the measurement techniques for magnetic susceptibility logging systems include U.S. Pat. Nos. 2,623,923 (Zimmerman), 2,625,583 (Broding) and 3,555,409 (Atwood et al). The measurement techniques disclosed in these patents are made without reference to temperature stability or the reduction of measurement drift. U.S. Pat. No. 2,640,869 (Zimmerman) discloses a temperature compensated susceptibility logging system. This system uses the temperature change in the resistance of one arm of a Maxwell bridge to compensate for variation caused by temperature changes in the measurement solenoid of the system in another arm of the Maxwell bridge. Maintaining the balance in this system is very difficult and thermal drift has still been unacceptable. A probe having a resistance heater surrounding the sensing coil was manufactured and sold by Simplec Manufacturing Company of Dallas, Tex., in 1971. The heater of the probe was thermoregulated through use of a transistorized power control circuitry using a thermistor to sense solenoid temperature and to feed back a bias voltage to the thermoregulator. A disadvantage is that the heater in the device interferes with the electromagnetic properties of the sensing solenoid.

In the early development and testing of prototype magnetic susceptibility well-logging probes by Broding and others, it was shown that changes in the magnetic susceptibility of rock were accompanied by nearly proportional changes in the amplitude of the quadrature phase of a bridge output signal of the probe. Thus, it was not difficult to design a measurement system with sufficient sensitivity to detect changes as small as one micro cgs unit, representing approximately 4 ppm. magnetite. However, it has been extremely difficult to stabilize the drift and reduce the noise so that borehole-logging measurements could be made at high sensitivities. Tests have shown that without any form of temperature stabilization, the drift has commonly exceeded 1,000 micro cgs units per hour. In addition, noise levels have been detected which have been as large or larger than the anomalies of interest (20 micro cgs units). While the Simplec design represented a significant improvement over previous systems, drift and noise are still too high to make accurate and reliable measurements of magnetic materials.

In U.S. Pat. No. 2,615,956 (Broding), a well-logging system is disclosed in which variations in the impedance of the cable, resulting from temperature variations to which the cable is subjected as it is lowered into the bore hole, are eliminated in the bridge measuring network, this being accomplished using frequency modulated signals. It has also been disclosed in U.S. Pat. No. 3,831,082 (Mazzagatti) that a monitoring system for the mud used in well drilling can be employed to provide a log of the magnetic susceptibility of earth formations traversed by the bore hole. In the device disclosed in this patent, a mud sampling channel is provided where the flow of mud is temperature stabilized.

SUMMARY OF THE INVENTION

In accordance with the present invention, a magnetic susceptibility sensor assembly for well-logging or the like is disclosed which is thermoregulated. The sensing assembly includes a sensing solenoid having a core and a coil disposed around the core. A nonmetallic container is provided in which the sensing solenoid is mounted and a plurality of heaters are located in the container and spaced uniformly about the sensing solenoid. A heat transfer material is provided between the heaters and the sensing solenoid so that the heat produced by the heaters is substantially uniformly conducted to the sensing solenoid to maintain the sensing solenoid at a uniform temperature.

In the preferred embodiment of the present invention, a temperature sensor is located adjacent to the sensing solenoid and a temperature control means is employed which controls the output of the heaters in response to the temperature sensed by the temperature sensor. A layer of heat insulation is contained in a sleeve located about the container. Advantageously, an electrostatic shield is provided having the form of a plurality of self-sticking printed circuit copper strips. The heat transfer material is preferably a highly viscous, thermally stable silicone grease.

An important advantage of the present invention is that the magnetic susceptibility sensor assembly enables susceptibility measurements to be made independently of the external temperature so long as the external temperatures do not exceed the regulated temperature of the sensor assembly. Other features include the advantageous mounting of the heaters for the sensor assembly about the sensing solenoid and the provision of a means for conducting the heat generated by the heaters to the sensing solenoid which does not change in viscosity at elevated temperatures.

Other features and advantages of the present invention are stated in, or apparent from, the detailed description of a presently preferred embodiment of the invention found hereinbelow.

DETAILED DESCRIPTION OF THE PREFERRED EMBODIMENT

Figure 1:
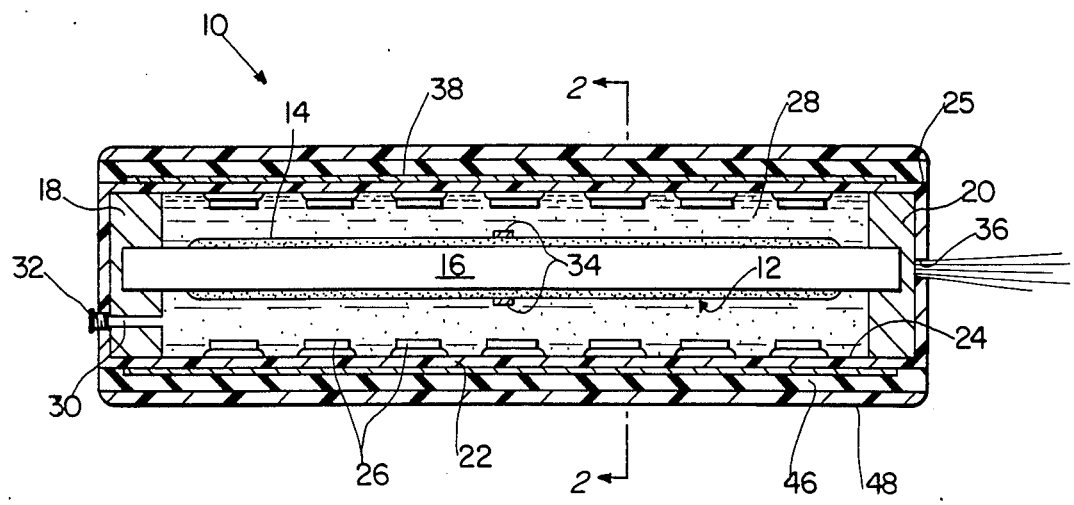
FIG. 1 an axial cross-sectional view of a sensor assembly according to the present invention.
Figure 2:
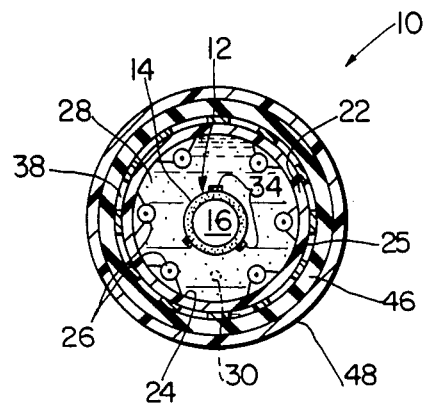
FIG. 2 is a radial cross-sectional view of the sensor assembly depicted in FIG. 1.

With reference now to the drawings in which the same numerals represent like elements throughout the several views, a presently preferred embodiment of a sensor assembly used for magnetic susceptibility well-logging is depicted in FIGS. 1 and 2. The sensor assembly, which is generally denoted 10, includes a sensing solenoid 12 having a coil 14 and a core 16. Preferable coil 14 is made of Number 22 copper wire wound with two layers and 800 turns about core 16 which is made of ferrite and is of an acceptable diameter 1.5 cm.) and length (30 cm.). The factors which influence the core material chosen include high resistance to mechanically induced fracture, minimum change of initial permeability with temperature, ture, and maximum permeability for a given magnetic flux sensitivity. Sensing solenoid 12 is held in place and protected from mechanical shock by end supports 18 and 20. End supports 18 and 20 are in turn mounted in a nonmetallic container 22. Container 22 is coaxial with core 16 and preferably made of a thermosetting plastic.

Located on the interior wall 24 of container 22 are a plurality of heaters 26. Heaters 26 are arranged in an array which is distributed equidistance from the center of core 16, at equal distances around a cylinder concentric with coil 14 and at equal increments along the axis of sensing solenoid 12. It should be noted that with a spacing between heaters 26 and sensing solenoid 12 of about 1.25 cm., side effects in sensing solenoid 12 due to current flow through the heaters 26 are greatly reduced.

It should also be noted that an even number of heating element strings or columns such as the six strings shown in FIG. 2, are connected in a series so that equal amounts of heater electrical current flow in opposite directions parallel to the axis of core 16 to further reduce side effects due to current flow in sensing solenoid 12. In the preferred embodiment, heaters 26 are electrical resistance heaters of 5.1 ohms each. Heaters 26 are conveniently glued with epoxy to interior wall 24.

As shown in FIGS. 1 and 2, heaters 26 are spaced from sensing solenoid 12. Located between heaters 26 and sensing solenoid 12 is a highly visous, thermally stable silicone grease 28. Grease 28 provides an efficient heat transfer material so that heaters 26 can be spaced from sensing solenoid 12 while the heat produced by heaters 26 is substantially uniformly conducted to sensing solenoid 12. It should be noted that the array of heaters 26 is designed to provide an even distribution of generated heat about sensing solenoid 12. The space between heaters 26 and sensing solenoid 12 is completely filled with the viscous vacuum seal grease through a threaded filler hole 30 in end support 18 in the end of container 22. Threaded filler hole 30 accepts a standard grease gun fitting and after filling is accomplished, the grease fitting is unscrewed and a non-metallic plug 32 is screwed in filler hole 30.

The temperature of sensing solenoid 12 is sensed by three temperature sensors 34 located at the longitudinal center of and equidistant about sensing solenoid 12. Preferably, temperature sensors 34 are two-terminal integrated circuit-temperature transducers. The temperatures sensed by temperature sensors 34 are communicated to a temperature control system via a wire in an access hole 36 in end support 20 in the end of container 22. Electrical power for heaters 26 is also provided by a wire passing through access hole 36.

Figure 3:
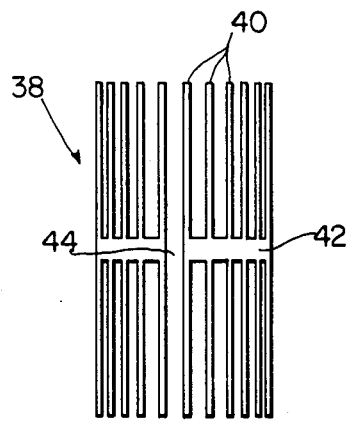
FIG. 3 is a front elevational view of the electrostatic shield of the sensor assembly.

An electrostatic shield 38, which is also shown in FIG. 3, is provided around the outside of container 22. The desirability of an electrostatic shield is explained in U.S. Pat. No. 2,623,923 (Zimmerman), which patent is hereby incorporated by reference. Electrostatic shield 38 consists of self-sticking printed circuit copper strips 40 which are 3 mm. wide and equal in length to core 16. Strips 40 are separated by approximately 1 cm. and electrically shorted together by a discontinuous, nearly complete ring 42 around the circumference and halfway from the ends of strips 40. As shown best in FIG. 3, ring 42 has a gap 44. Ring 42 is not completed all of the way around the circumference of container 22 because this would present a shorted turn to the magnetic field, and alter the operation of sensing solenoid 12. Electrostatic shield 38 is attached to ground. Strips 40 are applied along exterior wall 25 of container 22 parallel to the longitudinal axis of sensing solenoid 12.

A layer of thermal insulation 46 is located about container 22 and electrostatic shield 38 along the length of container 22. Thermal insulation 46 minimizes heat transfer from heaters 26 to the external environment of sensor assembly 10. Surrounding thermal insulation 46 is a non-metallic pressure resistant sleeve 48 located concentrically about container 22. Thermal insulation 46 completely fills any voids between exterior wall 25 of container 22 and sleeve 48.

Figure 4:
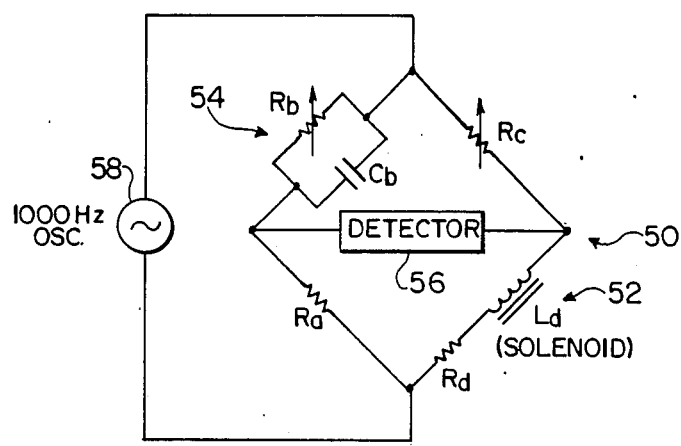
FIG. 4 is a schematic diagram of a Maxwell bridge used with the sensor assembly for well-logging.

Depicted in FIG. 4 is a schematic diagram of the Maxwell bridge 50 used in the magnetic susceptibility well-logging system of the present invention. Magnetic susceptibility in a borehole is measured by detecting changes in effective inductance of a solenoid $L_d$. In order to thermally stabilize bridge 50, resistors and capacitors with low temperature coefficients are used.

Arm 52 of bridge 50 represents sensing coil 14 having an inductance $L_d$ and effective resistance $R_d$. Arm 54 contains a capacitor $C_b$ that balances the reactance of sensing solenoid 12. Variable resistors $R_b$ and $R_c$ are used to null bridge 50 in air so that the signal measured by detector 56 is 0. Resistor $R_a$ is fixed at a resistance equivalent to the reactance of sensing coil 14. Crystal-stabilized oscillator 58 for bridge 50 is provided. Conveniently, oscillator 58 is a crystal oscillator operating at 1,000 Hz. The balance equations for bridge 50 are as follows:

$$L_d = R_a R_c C_b$$

$R_d = R_a R_c / R_b$

Magnetically susceptable materials change the inductance, whereas conductive materials change the effective resistance of sensing solenoid 12. These changes are converted into voltages representative of the magnetic susceptibility and conductivity of the surrounding medium by appropriate phase shifting and comparison with a reference signal.

Figure 5:
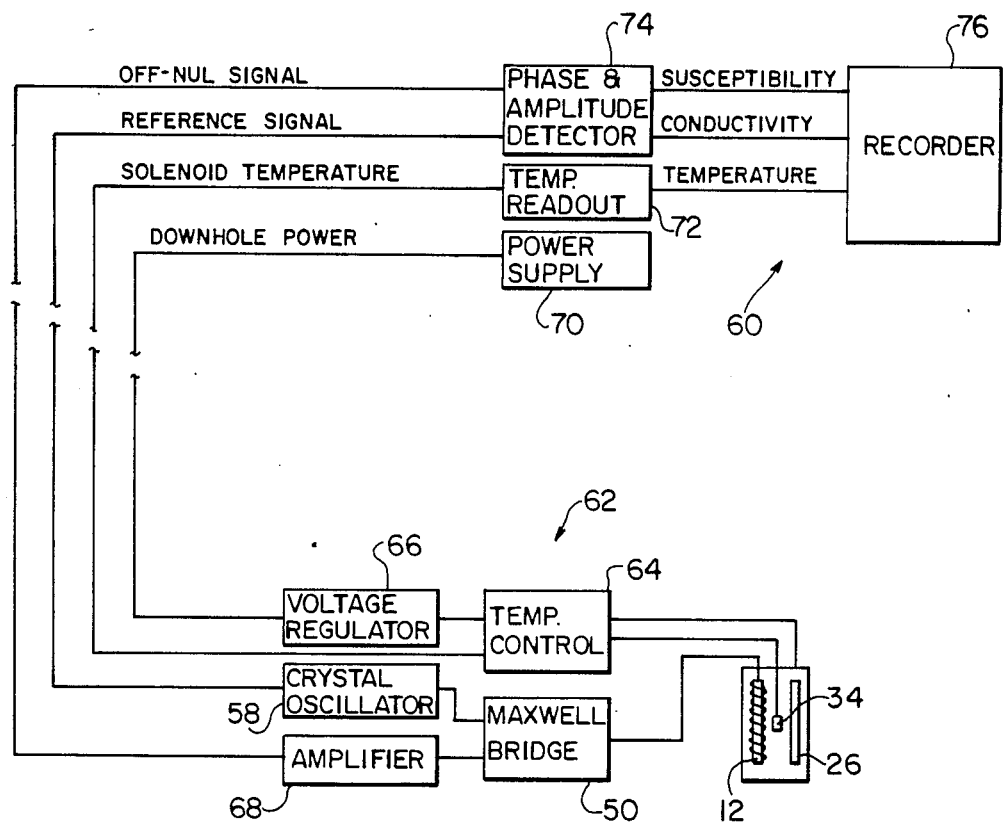
FIG. 5 is a block diagram of the surface electronics and the sensor assembly electronics for the well-logging system.

In FIG. 5, a block diagram is provided of the surface electronics 60 and sensor electronics 62. Sensor electronics 62 is located with sensor assembly 10 in the borehole of the well during operation. Sensor electronics 62 includes a temperature controller 64 which is connected to temperature sensors 34 and heaters 26. Temperature controller 64 receives a regulated voltage from voltage regulator 66. Maxwell bridge 50 of sensor electronics 62 is connected to sensing solenoid 12 and crystal oscillator 58 as shown. The signal from bridge 50 is sent to an amplifier 68.

Surface electronics 60 of the well-logging system includes a power supply 70 which supplies power to voltage regulator 66. A temperature readout 72 is also provided in surface electronics 60. Temperature readout 72 is connected to temperature controller 64 so that the temperature measured by temperature sensors 34 can readily be determined on the surface. A phase and amplitude detector 74 is provided to receive a reference signal from crystal oscillator 58 and the off-null signal of Maxwell bridge 50 from amplifier 68. Phase and amplitude detector 74 converts these two signals to a susceptibility signal and a conductivity signal. The susceptibility signal and conductivity signal are recorded by a recorder 76. Recorder 76 also records the temperature shown by temperature readout 72.

In operation, sensor assembly 10 functions in the following manner. Initially, after sensor assembly 10 is assembled, plug 32 is removed and a grease fitting is attached to filler hole 30. Sensor assembly 10 is then inverted so that filler hole 30 is lowermost and a grease gun is attached to the grease fitting. Using this grease gun, grease is then inserted in container 22 to completely fill the space between sensing solenoid 12 and heaters 26. After this is done, the grease fitting is removed and plug 32 is reinserted in filler hole 30.

When sensor assembly 10 is to be used, temperature control 64 is set to the desired temperature. Preferably, temperature controller 64 is set for one of three temperatures, for example 60°, 80°, and 100° C. The temperature selected should be high enough to stay above any expected downhole temperatures and also to take advantage of flat spots in the temperature-dependent inductance curve of sensing solenoid 12. With the system shown, the temperature of sensing solenoid 12 should be controlled within about 0.1° C. The use of grease 28 also keeps the temperature of sensing solenoid 12 substantially uniform over the length thereof due to the good heat conductivity of the grease. Thus, with sensing solenoid 12 maintaining a substantially uniform temperature, the magnetic susceptibility of the surrounding medium detected by Maxwell bridge 50 is amplified and ultimately recorded by recorder 76. Temperature control 64, by use of temperature sensors 34, also insures that sensing solenoid 12 is maintained at the desired temperature throughout the measurement period.

While the embodiment of the present invention described above is preferred, a number of other embodiments are possible. For example, the composition of both solenoid and heaters can be changed as better materials become available as long as they satisfy the requirements discussed above. For example, new core materials and conductors can be used for the construction of the solenoid as long as they improve permeability or resistance to vibration without altering the temperature sensitivity. Similarly, other heater elements may be used as long as changes in the heater current can be shown not to influence the susceptibility measurement. Additionally, coils with different numbers of turns per layer and number of layers, different coil wire diameters, different heat conducting fluids, different heater configurations, and different heater element materials are possible.

Preliminary tests performed with the sensor assembly according to the present invention indicate that the system drift is less than 10 micro cgs units per hour and that the electronic noise is less than one micro cgs unit. This is considerably lower than the geologic and drill-induced noise in most mineral-exploration boreholes. Thus, the high stablility and sensitivity of the system makes it possible to detect subtle anomalies (less than 10 micro cgs units) that are commonly associated with the mineralization in sedimentary rock. In addition, larger anomalies (1000 micro cgs units or more) that are sometimes associated with alteration zones and mineralization in igneous and metamorphic rocks can be detected.

Although the present invention has been described with respect to an exemplary enbodiment thereof, it will be understood by those of ordinary skill in the art that other variations and modifications can be effected within the scope and spirit of the invention.

We claim:

1. A thermoregulated magnetic susceptibility sensor assembly for use in measuring the magnetic susceptibility of rocks in the earth comprising:
    a non-mettallic container normally closed to the passage of fluids therefrom;
    a sensing solenoid comprising an elongated core and a coil wound around said core, said sensing solenoid being mounted within the container and spaced from the walls of said container;
    a plurality of separate heaters located in said container and arranged uniformly about said sensing solenoid along its length and spaced therefrom to provide an even distribution of heat to the solenoid; and
    a heat transfer material within said container filling the space between said plurality of heaters and said sensing solenoid and contacting them for ensuring that the heat produced by said plurality of heaters is substantially uniformly conducted to said sensing solenoid so as to maintain said sensing solenoid at a uniform temperature during the use of the sensor in making magnetic susceptibility measurements.

2. A magnetic susceptibility sensor assembly as claimed in claim 1 further including a temperature sensor means disposed adjacent said sensing solenoid for sensing the temperature of said sensing solenoid, and a temperature control means for controlling the heat output of said plurality of heaters in response to the temperature sensed by said temperature sensor means in order to maintain said sensing solenoid at a substantially uniform temperature.

3. A magnetic susceptibility sensor assembly as claimed in claim 2 further including a layer of heat insulation surrounding said plurality of heaters to minimize heat transfer from said plurality of heaters to the external environment of the sensor assembly.

4. A magnetic susceptibility sensor assembly as claimed in claim 3 further including a non-metallic outer sleeve in which said container is received, said layer of heat insulation being located between said container and said sleeve.

5. A magnetic susceptibility sensor assembly as claimed in claim 3 wherein said plurality of heaters comprise electrical resistance heaters which are arranged in an even number of columns about the longitudinal axis of said container and wherein said electrical heater columns are connected in series with the current in adjacent columns flowing in opposite directions.

6. A magnetic susceptibility sensor assembly as claimed in claim 5 and further including an electrostatic shield which is located adjacent the external surface of said container and which is connected to ground.

7. A magnetic susceptibility sensor assembly as claimed in claim 6 wherein said electrostatic shield comprises a plurality of self-sticking printed circuit copper strips applied parallel to the axis of said sensing solenoid and uniformly spaced from one another and an incomplete copper ring which electrically connects all of the strips together, said ring being located midway between the ends of said copper strips.

8. A magnetic susceptibility sensor assembly as claimed in claim 6 wherein said core, said coil, and said container have circular cross sections when viewed in a plane perpendicular to the longitudinal axis of said sensing solenoid.

9. A magnetic susceptibility sensor assembly as claimed in claim 8 further including a fill hole and plug located in one end of said normally closed container through which the heat transfer material can be supplied to the space between said plurality of heaters and said sensing solenoid by removing the plug.

10. A magnetic susceptibility sensor assembly as claimed in claim 9 wherein said heat transfer material comprises a highly viscous, thermally stable silicone grease.

11. A magnetic susceptibility sensor assembly as claimed in claim 9 wherein said container is made of a thermosetting plastic tube, said core is made of ferrite, said coil is made of copper wire.

* * * * *